United States Patent [19]

Dietrich et al.

[11] 4,256,393
[45] Mar. 17, 1981

[54] ELECTRONIC FLASH ATTACHMENT FOR CAMERAS, PROVIDED WITH PLURAL CIRCUITS FOR DIFFERING CAMERA TYPES AND A REMOVABLE CONNECTOR MODULE

[75] Inventors: Rolf Dietrich, Hofheim; Heinz Häfner, Nuremberg; Wolfgang Pecher, Forchheim, all of Fed. Rep. of Germany

[73] Assignee: Metz Apparatewerk Inh. Paul Metz, Fürth, Fed. Rep. of Germany

[21] Appl. No.: 82,411

[22] Filed: Oct. 5, 1979

[30] Foreign Application Priority Data

Dec. 23, 1978 [DE] Fed. Rep. of Germany ....... 2856092

[51] Int. Cl.$^3$ ........................................... G03B 15/03
[52] U.S. Cl. ................................................ 354/145
[58] Field of Search ..................... 354/27, 126, 32–35, 354/129, 139, 140, 141, 145, 149

[56] References Cited

U.S. PATENT DOCUMENTS

| | | |
|---|---|---|
| 3,263,583 | 8/1966 | Schmidt ........................... 354/129 X |
| 3,776,112 | 12/1973 | Wilwerding .......................... 354/33 |
| 3,782,258 | 1/1974 | Boekkool et al. .................... 354/126 |
| 4,095,242 | 6/1978 | Tsunekawa et al. ............. 354/149 X |
| 4,095,245 | 6/1978 | Kuraishi ............................... 354/141 |

FOREIGN PATENT DOCUMENTS 1522281 8/1969 Fed. Rep. of Germany ........... 354/145

*Primary Examiner*—Donald A. Griffin
*Attorney, Agent, or Firm*—Michael J. Striker

[57] ABSTRACT

An electronic flash attachment accommodates plural circuits, one of which is used for differing types of cameras and others of which are each used for a particular respective type of camera. The flash attachment has a contact socket with contact elements electrically connected to the plural circuits. A connector module is removably provided on the flash attachment and can be replaced by a different connector module for a different type of camera. The connector module has a first face provided with first contact elements which engage those of the contact-socket contact elements associated with those of the plural circuits which are to be used with the type of camera for which the connector module is intended. The connector module has a second face configured to be received in a camera's flash-attachment mounting shoe and provided with second electrical contacts electrically connected to the first and so disposed as to conductively engage the contact elements with which such mounting shoe is provided.

14 Claims, 3 Drawing Figures

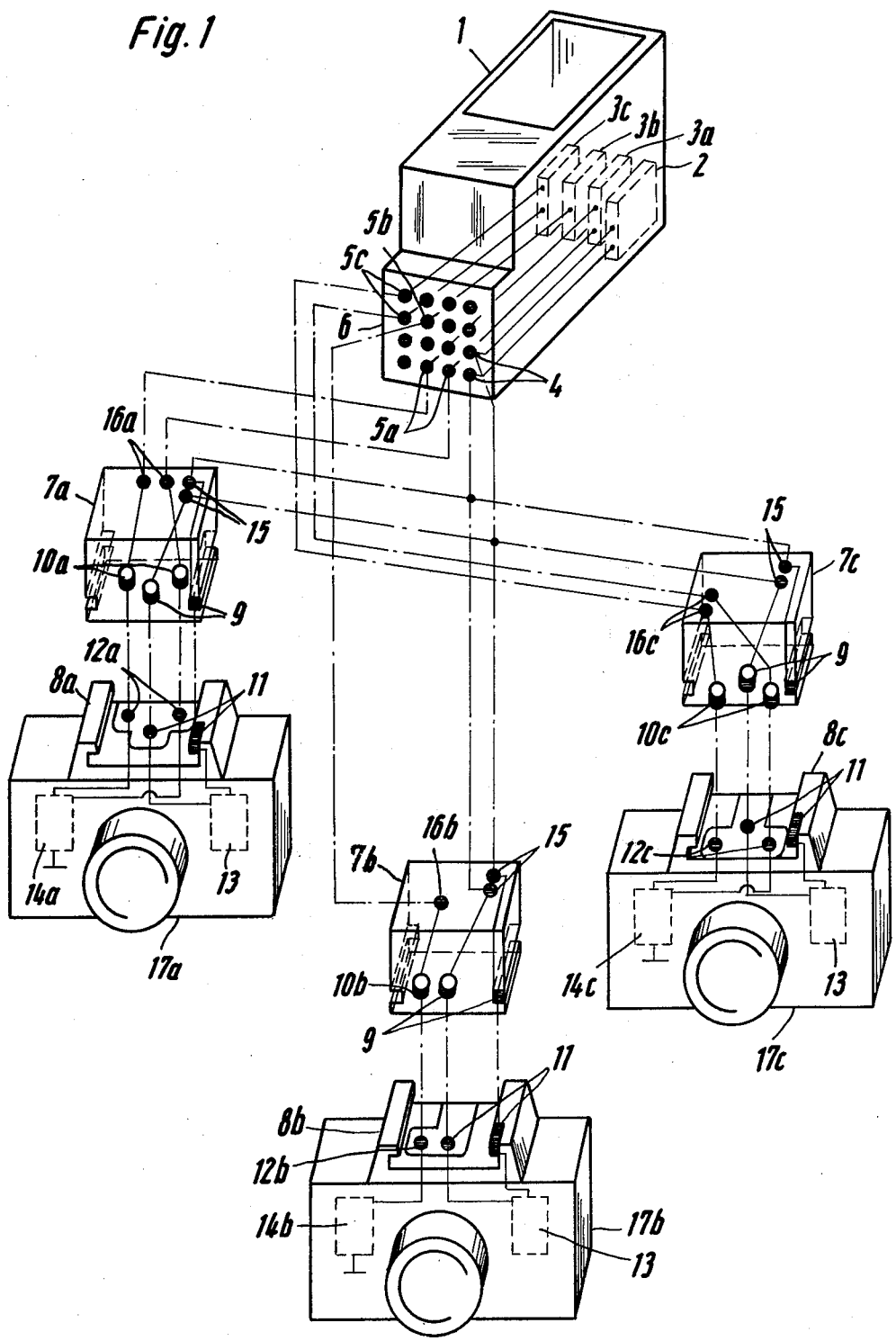

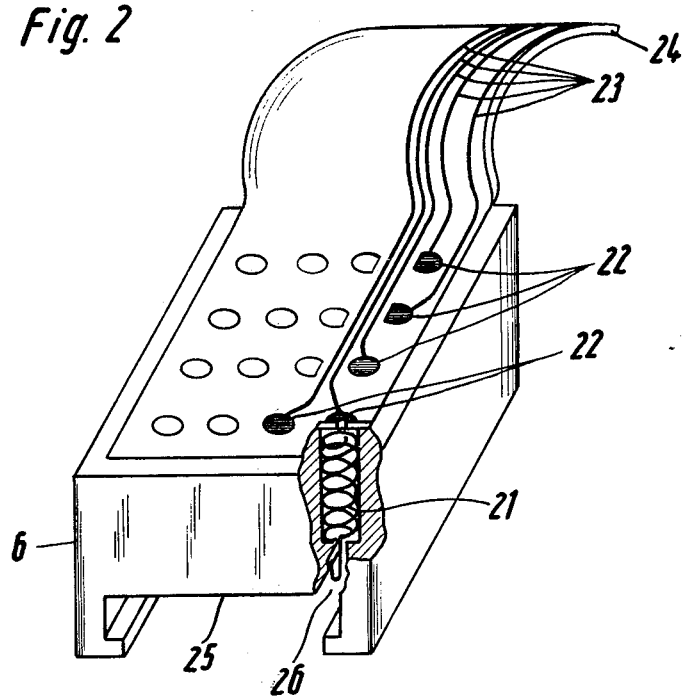
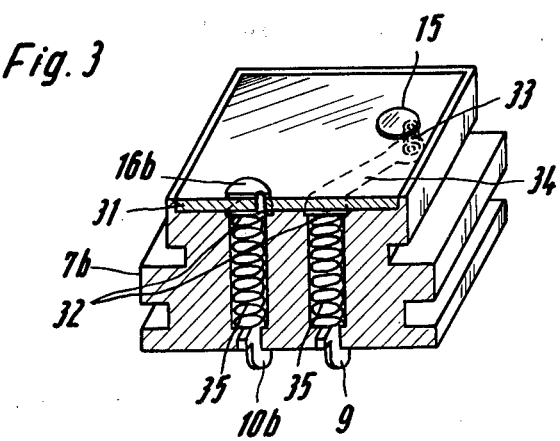

ELECTRONIC FLASH ATTACHMENT FOR CAMERAS, PROVIDED WITH PLURAL CIRCUITS FOR DIFFERING CAMERA TYPES AND A REMOVABLE CONNECTOR MODULE

BACKGROUND OF THE INVENTION

The present invention concerns electronic flash attachments for photographic cameras, of the type which are mounted on a camera's flash-attachment mount, the mounting of the attachment on the mount effecting electrical connections between circuitry internal to the flash attachment and circuitry internal to the camera.

Electronic flash attachments are used, of course, to illuminate the scene which a camera is to photograph. The flash attachment is typically electrically connected to the camera to assure correct operation, e.g. to synchronize the emission of flashed light with the opening of the camera's shutter.

With conventional flash attachments, the connector employed is typically a mounting shoe permanently mounted on the camera housing, the flash attachment having a mounting foot which slides into the mounting shoe and furthermore establishes electrical connections between contacts of the mounting foot and shoe. Such a connecting action permits a two-pole electrical connection, implemented via a so-called ground contact and a synchronization contact of the camera. Such mounting feet and mounting shoes are highly standardized, so that an electronic flash attachment having such a mounting foot can be used in cooperation with any camera having a standardized mounting shoe.

However, over the years, cameras have been developed whose cooperation with their associated flash attachments go beyond the mere use of a synchronization contact. For example, in some camera plus flash-attachment systems, there is provided in the camera viewfinder a visible indication of whether the flash unit is or is not in readiness to perform a flash. In other systems, the flash unit automatically transmits to the camera a signal informing a control circuit that the camera shutter speed is to be adjusted in correspondence to flash operation. In further such systems, the camera's internal exposure-duration control system furnishes a signal to the flash attachment, commanding flash termination. Such additional instances of cooperation between the camera and the flash attachment of course make necessary the provision of implementing circuitry both internally of the camera and internally of the flash attachment, as well as means for connecting together such camera and flash-attachment circuitry.

These differing versions of additional cooperation between camera and flash attachment are different in different camera plus flash-attachment systems, with the result that a special electronic flash attachment is required for each different system and can only be used with the camera of that system.

SUMMARY OF THE INVENTION

It is the general object of the invention to provide an electronic flash attachment, and also a connector for connecting such flash attachment to a camera, such that a variety of cameras of differing types, i.e., which cooperate with electronic flash attachments in differing manners, can all be used with one and the same flash attachment.

In accordance with the present invention, an electronic flash attachment is provided accommodating a plurality of differing electrical circuits respective ones of which cooperate with internal circuitry of cameras of differing respective types. The flash attachment is provided with a connector module which is intended for a camera of a particular type but which is removable to permit substitution of another connector module intended for a camera of a different type. The connector module serves to connect the contacts of the camera type for which it has been designed with those contacts of the flash attachment which are associated with the particular one or ones of the flash attachment's circuits needed for cooperation with the type of camera involved in a particular instance of use.

With the present invention, one flash attachment can be used for cameras of differing types, it being only necessary, when using the attachment with a camera of another type, to acquire a new connector for such camera. This makes it possible for flash-attachment manufacturers to reduce the number of flash-attachment designs which they need produce for cameras of differing types, and likewise makes possible the stocking of fewer designs of flash attachments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 schematically depicts how, in accordance with the invention, a single flash attachment can be used in cooperation with cameras of differing types employing connector modules removably mounted on the flash attachment;

FIG. 2 depicts in greater detail a representative flash-attachment contact socket into which a connector module is engaged; and FIG. 3 depicts in greater detail a representative connector module.

DESCRIPTION OF THE PREFERRED EMBODIMENTS

In FIG. 1, numeral 1 denotes an electronic flash attachment, and also depicted are three differing cameras 17a, 17b, 17c each provided with a respective mounting and connector shoe 8a, 8b, 8c whose contact elements 11 (ground contact and synchronization contact) are each electrically connected to a switch unit 13 located internally of each camera 17a, 17b, 17c and of identical configuration in each of the three differing cameras. Switch unit 13 is typically the ordinary synchronization switch of the camera and is coupled to the camera's shutter mechanism. The contact elements 12a, 12b, 12c of the connector shoes 8a, 8b, 8c, each of which is differently located on the respective connector shoe, are electrically connected to respective circuits 14a, 14b, 14c located internally of the respective cameras 17a, 17b, 17c, the circuits 14a, 14b, 14c differing from each other with respect to configuration and/or function.

Electronic flash attachment 1 accommodates a circuit unit 2 for firing its flash tube, circuit unit 2 being used for all three of the camera types involved. Additionally, flash attachment 1 accommodates further circuit units 3a, 3b, 3c which serve different respective purposes in cooperation with respective ones of the differing cameras 17a, 17b, 17c. Circuit units 3a, 3b, 3c internal to flash attachment 1 are electrically connected to respective contact elements 5a, 5b, 5c of a contact socket 6 provided on flash unit 1. The circuit unit 2, which is internal to flash attachment 1 and used for all camera types involved, is connected to contact elements 4 on the contact socket 6.

Numerals 7a, 7b, 7c depict three different connector units, each capable of being mounted on and making the correct electrical connections with a respective one of the three differing connector shoes 8a, 8b, 8c of the three differing cameras 17a, 17b, 17c.

At the side of each connector unit 7a, 7b, 7c which engages in the respective connector shoe 8a, 8b, 8c, the connector unit is provided with contact elements 9, identically located on each connector unit 7a, 7b, 7c, and is also provided with respective contact elements 10a or 10b or 10c. The differing locations of contact elements 10a, 10b, 10c on respective connector units 7a, 7b, 7c correspond to the locations of contact elements 12a, 12b, 12c on respective ones of the connector shoes 8a, 8b, 8c. The contact elements 9 identically located on all three connector units 7a, 7b, 7c correspond in location to the contact elements 11 which are identically located on the three differing connector shoes 8a, 8b, 8c. As shown in FIG. 1, the contact elements 9, 10a, 10b, 10c are electrically connected, internally of their respective connector units 7a, 7b, 7c, to the respective ones of the contact elements 15, 16a, 16b, 16c on the opposite face of the respective connector unit, i.e., the face which connects into the contact socket 6 of flash attachement 1.

The sets of dash-dot-dash lines in FIG. 1 indicate which contact elements of the contact socket 6 engage with which contact elements on one face of the connector units 7a, 7b, 7c, and which contact elements on the other face of the connector units 7a, 7b, 7c engage with which contact elements of the connector shoes 8a, 8b, 8c.

FIG. 2 depicts a contact socket 6 whose lower wall 25 is provided with slits 26 behind which are located spiral compression springs 21. At the lower end of each compression spring 21, the last half of approximately the last turn of the spring is bent at a right angle and projects down and out through the respective slit 26. The upper end of each compression spring 21 is electrically connected to the enlarged end 22 of a respective conductive path 23 provided on a preferably flexible printed conductor-path plate 24. The other end of the printed conductive paths 23 are connected to corresponding ones of the circuit units 2, 3a, 3b, 3c internal to the flash attachment 1.

FIG. 3 depicts a representative connector unit 7b, the other connector units 7a and 7c being similarly constructed. The contact elements 15, 16a, 16b, 16c which engage with the contact socket 6 are provided as conductive surface portions provided on the upper face of a printed conductor plate 31, on whose lower face the printed conductors are provided. Electrical connection between the conductive surface portions 15, 16a, 16b, 16c on the upper face of printed conductor plate 31 and the printed conductors 34 on the lower face thereof is established by bores 33 which pass from one through to the other face of plate 31, the bores 33 accommodating electrically conductive material. Each printed conductor 34 on the underface of plate 31 has, at its other end, a conductive surface 32. As shown for conductive surface 16b in FIG. 3, on the upper face of plate 31, the conductive surfaces on the upper and lower faces of plate 31 may be in register, in which case extended printed conductors 34 may not be necessary, e.g., for some of the contact-element connections to be established. The illustrated connector unit is provided with a set of bores each accommodating a respective spiral compression spring 35 which at its upper end is in conductive engagement with a respective conductive surface 32 and at its lower end is electrically and mechanically connected to a respective one of contact elements 9 and 10a, 10b, 10c.

It will be understood that each of the elements described above, or two or more together, may also find a useful application in other types of connector configurations differing from the types described above.

While the invention has been illustrated and described as embodied in connection with representative camera connector shoes, connector or adapter units, and a representative contact socket for the flash attachment, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electronic flash attachment accommodating a plurality of differing electrical circuits different ones of which are intended for use with cameras of differing types, the flash attachment including a contact socket having a plurality of contact-socket spring-contact elements which are connected to different respective ones of the plurality of differing electrical circuits, the flash attachment furthermore including a removably mounted connector module intended for use with cameras of one type and removable from the flash attachment to permit replacement of the connector module by a different connector module when the flash attachment is to be used with a camera of different type, the removable connector module having a first portion which engages the contact socket of the flash attachment and being provided with first contact elements so spatially arranged that when the first portion engages the contact socket the first contact elements form electrical connections with the contact-socket contact elements of those of the differing electrical circuits which are to be used with cameras of the type for which the removable connector module is intended, the removable connector module having a second portion configured to be received in the flash-attachment mounting shoe of cameras of the type for which the removable connector module is intended and being provided with second contact elements spatially located and arranged so as to electrically engage the electrical contacts with which the mounting shoes of such cameras are provided, said contact socket having a wall provided with openings, and said spring contacts comprising cylindrical spiral springs accommodated in the contact socket and having respective first end portions bent to project out from the openings for engagement with the first contact elements of the connector module and having second end portions conductively connected to respective ones of the plurality of differing electrical circuits.

2. An electronic flash attachment as defined in claim 1, the contact socket being removably provided on or in the housing of the flash attachment or on a movably mounted, preferably swingably mounted, part of the flash attachment or being connected to one end of a flexible cable whose other end is fixedly or via a coupling device detachably connected to the flash attachment.

3. An electronic flash attachment accommodating a plurality of differing electrical circuits different ones of which are intended for use with cameras of differing types, the flash attachment including a contact socket having a plurality of contact-socket contact elements which are connected to different respective ones of the plurality of differing electrical circuits, the flash attachment furthermore including a removably mounted connector module intended for use with cameras of one type and removable from the flash attachment to permit replacement of the connector module by a different connector module when the flash attachment is to be used with a camera of different type, the removable connector module having a first portion which engages the contact socket of the flash attachment and being provided with first contact elements so spatially arranged that when the first portion engages the contact socket the first contact elements form electrical connections with the contact-socket contact elements of those of the differing electrical circuits which are to be used with cameras of the type for which the removable connector module is intended, the removable connector module having a second portion configured to be received in the flash-attachment mounting shoe of cameras of the type for which the removable connector module is intended and being provided with second contact elements spatially located and arranged so as to electrically engage the electrical contacts with which the mounting shoes of such cameras are provided, said contact socket including a printed conductor plate having printed conductive paths, the contact-socket contact elements being conductively connected to first portions of respective ones of the printed conductive paths, the conductive paths having second portions conductively connected to respective ones of the plurality of differing electrical circuits.

4. An electronic flash attachment as defined in claim 3, the printed conductor plate being a flexible plate.

5. An electronic flash attachment as defined in claim 3, the printed conductive paths being at at least one of their respective first and second portions formed as contact surfaces conductively engageable by contact elements merely pressed into physical contact against the contact surfaces.

6. An electronic flash attachment as defined in claim 3, the first portions of the printed conductive paths being formed as contact surfaces, the contact-socket contact elements being conductively connected to the contact surfaces by means of mere contact pressure.

7. An electronic flash attachment as defined in claim 3, the plurality of differing electrical circuits being provided on the printed conductor plate.

8. A connector module having a first portion engageable with the contact socket of an electronic flash attachment and being provided with first contact elements so spatially arranged that when the first portion engages such contact socket the first contact elements can form electrical connections with contact elements provided on such contact socket, the connector module having a second portion configured to be received in the flash-attachment mounting shoe of a camera and being provided with second contact elements spatially located and arranged so as to electrically engage the electrical contacts of such mounting shoe, the connector module including a plate of insulating material, the first contact elements being conductive surface portions provided on one face of the insulating plate, the insulating plate being provided on its opposite face with further conductive surface portions electrically connected to those of said one face of the plate, the second contact elements being conductively connected to the conductive surface portions on said opposite face of the plate, the insulating plate being a printed conductor plate, and the conductive surface portions on said one and said opposite face of the insulating plate being conductively connected together through throughgoing apertures provided in the insulating plate.

9. A connector module as defined in claim 8, the first and second contact elements of the connector module being conductively connected together by the constituent wires of a flexible cable.

10. A connector module as defined in claim 8, the connector module comprising a housing, the first contact elements being provided on a first face of the housing and the second contact elements being provided on a second face of the housing.

11. A connector module as defined in claim 10, the first and second faces of the housing being located opposite to each other.

12. A connector module as defined in claim 10, the insulating plate being provided on said first face.

13. A connector module as defined in claim 8, each of the second contact elements being one-piece items.

14. A connector module having a first portion engageable with the contact socket of an electronic flash attachment and being provided with first contact elements so spatially arranged that when the first portion engages such contact socket the first contact elements can form electrical connections with contact elements provided on such contact socket, the connector module having a second portion configured to be received in the flash-attachment mounting shoe of a camera and being provided with second contact elements spatially located and arranged so as to electrically engage the electrical contacts of such mounting shoe, the connector module including a plate of insulating material, the first contact elements being conductive surface portions provided on one face of the insulating plate, the insulating plate being provided on its opposite face with further conductive surface portions electrically connected to those of said one face of the plate, the second contact elements being conductively connected to the conductive surface portions on said opposite face of the plate, the connector module including spring-biased electrical connectors conductively connecting the second contact elements to said conductive surface portions on said opposite face of the plate.

* * * * *